Figure 1:
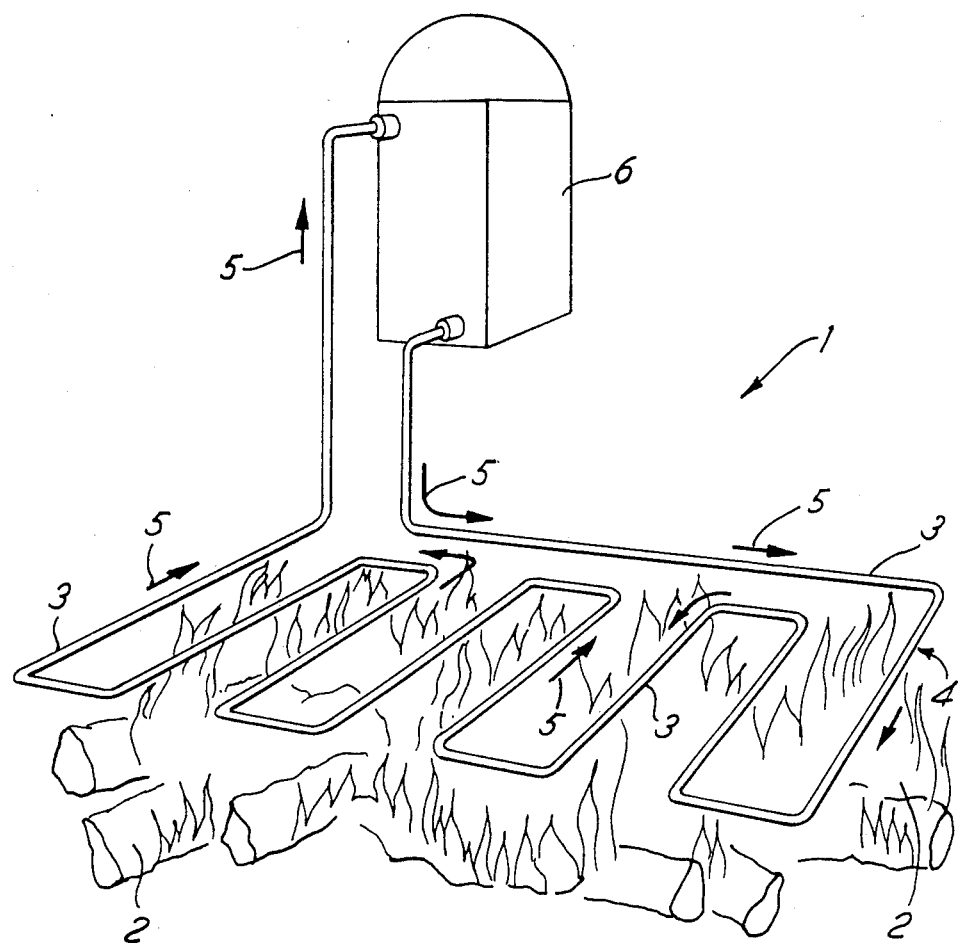

United States Patent [19]

Chan

[11] Patent Number: 4,798,132

[45] Date of Patent: Jan. 17, 1989

[54] CONTROLLABLE TEMPERATURE GRID ASSEMBLY FOR FOOD

[75] Inventor: Hing W. Chan, Tsuen Wan, Hong Kong

[73] Assignee: Hing Wah Houseware Manufactory Ltd., Hong Kong

[21] Appl. No.: 908,294

[22] Filed: Sep. 17, 1986

[30] Foreign Application Priority Data

Sep. 19, 1985 [GB] United Kingdom ................. 8523173

[51] Int. Cl.⁴ .................... A47J 27/026; A47J 37/06; A47J 43/18
[52] U.S. Cl. ........................................ 99/331; 99/422; 99/450; 99/470; 165/2
[58] Field of Search .................. 99/331, 330, 467–470, 99/422, 450; 126/374; 165/2; 426/523

[56] References Cited

U.S. PATENT DOCUMENTS

| | | | |
|---|---|---|---|
| 1,294,159 | 2/1919 | Potts | 99/450 X |
| 3,493,726 | 2/1970 | Bardeau | 99/422 X |
| 3,818,818 | 6/1974 | Hice, Sr. | 99/331 X |
| 4,156,454 | 5/1974 | Skala | 165/2 |
| 4,224,862 | 9/1980 | Liebermann | 99/331 |
| 4,410,030 | 10/1983 | Skala | 99/470 X |
| 4,623,544 | 11/1986 | Highnote | 99/331 X |
| 4,632,089 | 12/1986 | Wardell | 99/450 X |

FOREIGN PATENT DOCUMENTS 0050941 5/1982 European Pat. Off. .............. 99/331

*Primary Examiner*—James Kee Chi
*Attorney, Agent, or Firm*—Lalos & Keegan

[57] ABSTRACT

A controllable temperature grid assembly (1) on which food can be cooked or defrosted is provided which includes an array of spaced tubular members (3) interconnected to form a generally planar grid (4) on which food to be cooked or defrosted can be placed for cooking or defrosting, with the hollow interiors of the members (3) also being interconnected to form a circulation flow path (5) for a heat exchange medium. The assembly (1) also includes heat exchange means (6) in fluid flow communication with the heat exchange medium circulation flow path for extracting heat from or supplying heat to the heat exchange medium. A thermostat is provided in the heat exchange medium for controlling the temperature to which the heat exchange medium is heated or cooled being recirculation through the tubular members (3). When food is cooked on the grid heat is extracted from the tubular members (3) by the heat exchange medium flow to cool the members (3) and thereby reduce the tendency of food to stick to the members during cooking, the extracted heat is removed from the heat exchange medium during flow through the heat exchange means (6) and the cooled heat exchange medium recirculated along the heat exchange medium circulation flow path (5) through the tubular members (3). Frozen food is defrosted on the grid (4) by supplying heat to the tubular members (3) by the heat exchange medium flowing through the members (3) to warm the members (3) and thereby defrost the food. The cooled heat exchange medium is warmed during flow through the heat exchange means (6) and the warmed heat exchange medium recirculated along the heat exchange medium circulation flow path (5) through the tubular members (3).

8 Claims, 1 Drawing Sheet

CONTROLLABLE TEMPERATURE GRID ASSEMBLY FOR FOOD

This invention relates to a controllable temperature grid assembly for food on which food can be cooked or defrosted.

Conventional grills for cooking meat or like food utilize a grid for supporting the food to be cooked over a heat source. These grids conventionally are made of metal and in use attain quite high temperatures. These high temperatures cause the food being cooked to adhere to the grid, which conventionally is made of metal, as the water content in the food such as meat is driven off by the high temperature. The grids thus can attain locally high temperatures and their good conductivity will pass this local high temperature on to the food being cooked causing charring of the food such as meat at the points of contact with the grid. Such charred food is difficult to clean from the grid and can give rise to contamination of future food cooked on the grid and indeed may impair the taste and appearance of the food cooked on the grid.

Additionally food taken from a refrigerator or freezer be defrosted or thawed before it can be cooked in a conventional manner. This frequently is done by placing the food in air on a metal grid and allowing the food to warm to ambient temperature. If the food is deeply frozen when placed on such a conventional metal grid it will adhere thereto making it difficult to remove the food from the grid without leaving pieces of food attached to the grid with consequent risk of contamination of both the food and grid.

There is thus a need for a generally improved grid assembly for food which reduces and minimizes the tendency for food to adhere thereto during cooking or defrosting.

According to the present invention there is provided a controllable temperature grid assembly on which food can be cooked or defrosted, including an array of spaced tubular members interconnected to form a generally planar grid on which food to be cooked or defrosted can be placed for cooking or defrosting, with the hollow interiors of the members also being interconnected to form a circulation flow path for a heat exchange medium, and heat exchange means, in fluid flow communication with said heat exchange medium circulation flow path, for extracting heat from or supplying heat to said medium, so that in operation when food is cooked on said grid heat is extracted from the tubular members by said heat exchange medium flow to cool said members and thereby reduce the tendency of food to stick to said members during cooking, the extracted heat is removed from the heat exchange medium during flow through the heat exchange means, and the cooled heat exchange medium recirculated along the heat exchange medium circulation flow path through the tubular members, and when frozen food is placed on said grid heat is supplied to the tubular members by said heat exchange medium flowing through said members to warm said members and thereby defrost the food, the cooled heat exchange medium is warmed during flow through the heat exchange means and the warmed heat exchange medium recirculated along the heat exchange circulation flow path through the tubular members.

Preferably the tubular members are provided by a single tube having a rectangular serpentine configuration.

Advantageously the heat exchange medium utilized is a liquid or gas such as water, steam or Freon (Trade Mark).

Conveniently the heat exchange means incorporates a heat exchanger through which the heat exchange medium flows, which heat exchanger is air cooled/heated with or without forced circulation of the air.

Preferably in the grid assembly intended for use for cooking food, the tubular members are made of metal with or without a plastics non-stick or corrosion resistant coating.

Alternatively in a grid assembly intended for use for defrosting food the tubular members are made of metal, plastics and/or rubber.

For a better understanding of the present invention and to show how the same may be carried into effect, reference will now be made, by way of example, to the accompanying single FIGURE drawing, in which:

FIG. 1 is a perspective diagrammatic view of a controllable temperature grid assembly of the invention shown in operative association with a heat source for cooking food.

As shown in FIG. 1 of the accompanying drawings a controllable temperature grid assembly generally referenced 1 is suitable for use in cooking food over a heat source such as the illustrated fire 2 or for defrosting food (not illustrated). The assembly 1 includes an array of spaced tubular members 3 interconnected to form a generally planar grid generally indicated at 4 on which food to be cooked or defrosted can be placed for cooking or defrosting. As illustrated the tubular members 3 are preferably provided by a single tube bent or formed in a rectangular serpentine manner. These tubular members 3 have hollow interiors which are interconnected to form a circulation flow path as illustrated by arrows 5 in FIG. 1, for a heat exchange medium. The tubular members 3 may be made of metal with or without a plastics non-stick or corrosion resistant coating when the grid assembly is intended for use in cooking food over a heat source such as the fire 2. Alternatively the tubular members 3 may be made of metal, plastics, and/or rubber when the grid assembly is intended for use for defrosting food.

Additionally the grid assembly 1 includes heat exchange means 6 in fluid flow communication with the heat exchange medium circulation flow path as shown by the arrows 5, which flow path passes through the hollow interiors of the members 3. Any suitable heat exchange medium can be utilized such as a liquid or gas, for example water or Freon (Trade Mark). The heat exchanger means may function in any suitable manner and may be constructed in any suitable manner to provide for heat exchange whereby the heat exchange medium flowing in the tubular members 3 is either food cooled after passage through tubular members 3 over a heat source such as the fire 2, or warmed after passage through tubular members 3 in contact with food to be defrosted. Conveniently the heat exchanger means 6 incorporates a heat exchanger (not illustrated) through which the heat exchange medium flows, which heat exchanger is air cooled or heated with or without forced convection. If desired the heat exchange medium can be pumped or otherwise caused to flow through the tubular members 3 or the heat exchange medium utilized can be chosen such that its characteristics provide a natural flow thereof. Additionally the heat exchanger means 6 may incorporate a thermostat or like temperature control means for regulating or otherwise ensuring that the temperature of the heat exchange medium flowing through the tubular members 3 is kept to a desired level so that the tubular members 3 themselves forming the grid 4 may likewise be kept at a uniform temperature suitable for ensuring that food does not adhere to the members 3 during cooking over a fire 2 or does not adhere to the members 3 during defrosting. The heat exchanger means 6 may also include means for regulating the temperature of the heat exchange medium flowing therethrough in response to the thermostat such as by a fan which is switched on and off under the control of the thermostat to provide more or less cooling of the heat exchange medium flowing through the heat exchange means 6 and thereby more or less heat extraction.

In operation food to be cooked over the fire 2 is placed on the grid 4 and heat is extracted from the tubular members by the heat exchange medium flowing through said members 3 thereby cooling the members 3. The temperature of the members 3 is thus controlled, preferably by means of the thermostat in the heat exchange means 6, to a level such that the tendency of food to stick to the members 3 during cooking is reduced and minimized. Nevertheless the food can still be properly cooked on the grid 4 as it is exposed to the heat from the fire 2 through the spaces between the members 3 forming the grid 4. The heat extracted by the heat exchange medium from the tubular members 3 during flow there through is removed from the heat exchange medium whilst it flows through the heat exchange means and the cooled heat exchange medium is recirculated along the heat exchange medium circulation flow path 5 through the members 3 to maintain them at the desired temperature.

When the grid assembly 1 of the invention is to be used for defrosting food the frozen food is placed on the grid 4 and heat is supplied to the tubular members 3 by the heat exchange medium flowing there through to warm the members 3 and thereby defrost the food. The cooled heat exchange medium which has given up heat to the food being defrosted, via the members 3, is warmed during flow through the heat exchange means 6 and the warmed heat exchange medium recirculated along the heat exchange medium circulation flow path 5 through the tubular members 3 back to the food being defrosted. Again the temperature of the tubular members 3 can be controlled to a desired level by means of a thermostat on the heat exchange means 6 and the food being defrosted thereby prevented from sticking or adhering to the tubular members 3 during defrosting. In this case the heat exchange means 6 may include means for heating the heat exchange medium during passage there through, which heating means may be an electrical heater or merely ambient air at a higher temperature than the heat exchange medium being heated.

Thus food can be prevented from adhering or sticking to the tubular members 3 of the grid 4 and thereby the tubular members can be kept clean, free of charred or defrosting food deposits and thus less likely to corrode. The control of the temperature of the tubular members 3 to a temperature between the extreme high temperature of food being cooked and low temperature of food being defrosted significantly improves the corrosion resistance of the material from which the tubular members 3 are made and hence improves the surface life of the grid assembly.

What we claim is:

1. A controllable temperature grid assembly on which food can be cooked, including an array of spaced tubular members interconnected to form a generally planar grid on which food is placed for cooking by means of a high-temperature heat source below the grid, said tubular members comprising a single tube having a rectangular serpentine configuration and having hollow interiors interconnected to form a circulation flow path for a heat exchange medium, and heat exchange means in fluid flow communication with said hollow interiors for extracting heat from said medium, so that in operation when food is cooked on said grid, heat is extracted from the tubular members by said heat exchange medium flow, to cool said members and thereby reduce the tendency of food to stick to said members during cooking, the extracted heat being removed from the heat exchange medium during flow through the heat exchange means, and the cooled heat exchange medium recirculated through the hollow interiors of said tubular means.

2. A grid assembly according to claim 1, wherein the heat exchange medium utilized is liquid.

3. A grid assembly according to claim 1, wherein the heat exchange medium utilized is gas.

4. A grid assembly according to claim 2, wherein the heat exchange means incorporates an air cooled heat exchanger through which the heat exchange medium flows.

5. A grid assembly according to claim 4, wherein the heat exchange means includes a thermostat operative to regulate the temperature of the heat exchange medium recirculated in the tubular members.

6. A grid assembly according to claim 5, wherein the tubular members are made of metal.

7. A grid assembly according to claim 6, wherein the tubular members have a plastic non-stick coating.

8. A grid assembly according to claim 6, wherein the tubular members have a plastic corrosion resistant coating.

* * * * *